United States Patent [19]

Dominguez

[11] Patent Number: 5,010,626

[45] Date of Patent: Apr. 30, 1991

[54] HOSE CLAMP WITH FLANGED CAPTIVE TENSIONING NUT AND PIVOTED BRIDGING ELEMENT

[75] Inventor: Ramon P. Dominguez, Barcelona, Spain

[73] Assignee: Mikalor, S.A., Barcelona, Spain

[21] Appl. No.: 426,440

[22] Filed: Oct. 25, 1989

[30] Foreign Application Priority Data

Nov. 3, 1988 [ES] Spain .................................. 8803895
Feb. 10, 1989 [ES] Spain .................................. 8900808

[51] Int. Cl.⁵ .............................................. F16L 33/04
[52] U.S. Cl. ........................................ 24/279; 24/285
[58] Field of Search ............... 24/279, 285, 280, 281, 24/282, 283, 20 LS

[56] References Cited

U.S. PATENT DOCUMENTS

| | | | |
|---|---|---|---|
| 1,482,564 | 2/1924 | Isachson | 24/285 |
| 2,341,828 | 2/1944 | Tetzlaff | 24/279 |
| 2,570,985 | 10/1951 | Riemenschneider et al. | 24/279 X |
| 3,507,314 | 4/1970 | Zartler | 24/279 X |
| 4,521,940 | 6/1985 | Oetiker | 24/279 X |

FOREIGN PATENT DOCUMENTS

| | | | |
|---|---|---|---|
| 842739 | 6/1952 | Fed. Rep. of Germany | 24/279 |
| 276.858/5 | 4/1986 | Spain . | |
| 104484 | 3/1917 | United Kingdom | 24/279 |
| 576543 | 4/1946 | United Kingdom | 24/279 |

*Primary Examiner*—James R. Brittain
*Attorney, Agent, or Firm*—Dennison, Meserole, Pollack & Scheiner

[57] ABSTRACT

A hose clamp having a metal band provided with two closed end loops. Each end loop has a pair of aligned slots. A first loop is formed of a curved section and a straight section. A captive nut comprising a tubular threaded portion with a curved backing flange is inserted in the loop with the tubular portion projecting through a slot and the flanged portion abutting the internal curved portion of the loop. A tightening bolt with a flanged head is passed through the second loop and is threaded into the tubular portion to close the loop. A second embodiment shows a bridging element pivoted to the second loop.

6 Claims, 3 Drawing Sheets

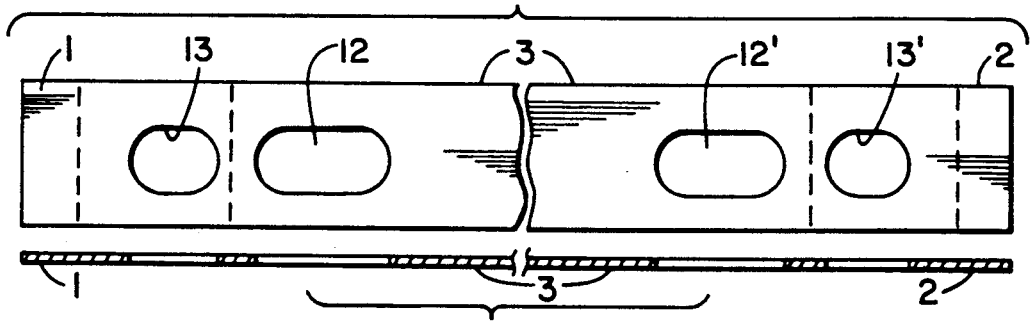
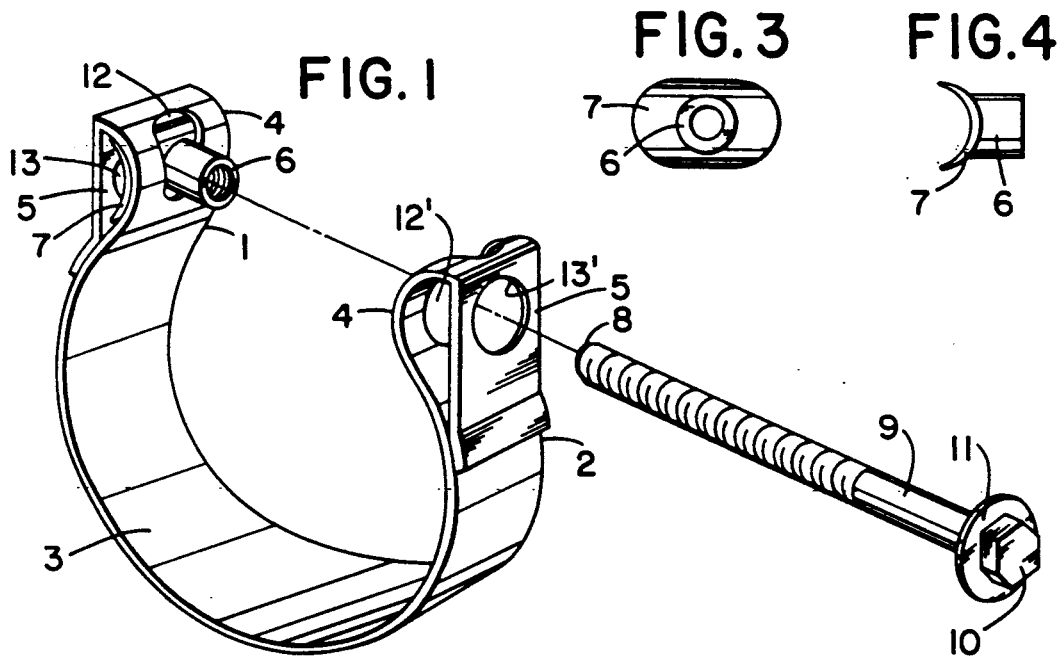
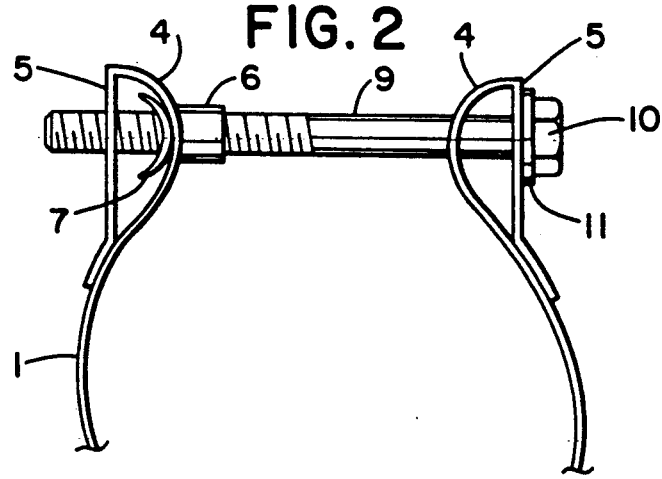

HOSE CLAMP WITH FLANGED CAPTIVE TENSIONING NUT AND PIVOTED BRIDGING ELEMENT

BACKGROUND OF THE INVENTION

This invention relates to a hose clamp which is formed of a metal band provided with two looped ends. In a first embodiment of the invention the looped ends are similar and comprise an inwardly facing curved portion joined by a relatively straight portion which is bonded to the band forming a closed loop. Each loop is provided with a pair of opposed slots for receiving a threaded bolt. One of the loops retains a captive nut which cooperates with the threaded bolt to tighten the clamp when the bolt is turned. The captive nut is provided with a curved flange whose curve matches that of the curved area of the loop.

In a second embodiment of the invention one of the loops is substantially circular and houses a bushing which pivotally supports a bridging element. Because of the pivoted relationship between the bridging element and the bushing, the bridging element can adjust to a best clamping relationship around the hose as the threaded bolt is tightened.

A number of hose clamps have been invented each of which possesses one or more drawbacks which this invention overcomes. One drawback in the prior art is the excessive friction developed during the tightening process which reduces the tightening property of the clamp. Another drawback in some of the prior art devices is the lack of a tightening screw which can be quickly tensioned by means of high speed automated wrenches. Also, in some designs the nut which receives the tightening screw can become detached and lost before the clamp is placed in use. Another disadvantage of some prior art clamps is that they are very heavy in relation to their size making them difficult to use in certain applications.

In prior art clamps formed by a strip rolled over itself forming end loops with a nut and bolt acting between the loops to tighten the clamp around the hose, there remains an uncovered space on the hose between the end loops. Because of this uncovered space between the loops there is no perpendicular force acting to seal the hose in this area as the clamp is gradually closed in a radial direction against the external walls of the hose. Consequently, there is a break in the annular constraining action of the clamp which results in a pinching of the hose in this area. This pinching action raises the flexible material in the unsupported area causing a defective seal.

To avoid this negative pinching effect, there is currently a rigid extension tab or bridge, with no joint, at the bottom of one of the clamp's ends. This rigid extension tab reduces the problem described above, since it creates a bridge which exerts pressure on the space without bunching the hose between the two ends of the clamps. However, as stated above, the advance of one end of the clamp towards the other is not straight but curved, and the extension tab is rigid and not jointed, so this known tab cannot adapt precisely to the curvature of the flexible tube. This inability to adapt to the curvature of the hose in the bridging space causes wrinkles and friction damage to the hose as the clamp is tightened.

So as to avoid the problems created by a rigid extension tab, this invention provides for a tab pivotally attached to one loop end of the clamp.

SUMMARY OF THE INVENTION

The overall object of the present invention is to improve upon the prior art hose clamps by providing a design which possesses reduced operational friction, is light in weight, and is adapted for automated tightening. Also, the locknut cannot be lost since it is seated and retained in an end loop.

It is a specific object of the invention to provide a captive nut seated within a loop wherein the captive nut has a flange conforming to the curvature of the loop and attached to the flange is a cylindrical internally threaded portion for receiving the tightening bolt. The cylindrical portion and attached flange can rotate through a limited angle in the loop mounting so as to adjust for differing clamping angles as the loops approach each other. If the captive nut was fixed to the loop, negative constraints would be caused by the curved advance of one end of the strip towards the other. This type of clamping feature is already known as shown in Spanish Patent No. 276.858/5 assigned to MIKALOR, S.A.

It is another object of the invention to provide an extension tab which is pivoted to a bushing mounted in one of the end loops. The pivoted relationship allows the extension tab to bridge the open space between the loops while applying maximum perpendicular pressure to the hose as the clamp is tightened.

BRIEF DESCRIPTION OF THE DRAWINGS

FIG. 1 is a perspective view shown the clamp of the invention in an open position with the locking screw aligned;

FIG. 2 shows the ends of the FIG. 1 clamp with the locking screw in position;

FIG. 3 is a plan view of the locking screw;

FIG. 4 is a side view of the locking nut;

FIG. 5 is a side view of the metal strip forming the band;

FIG. 6 is a plan view of the band showing the access slots;

DESCRIPTION OF THE PREFERRED EMBODIMENTS

Figure 7:
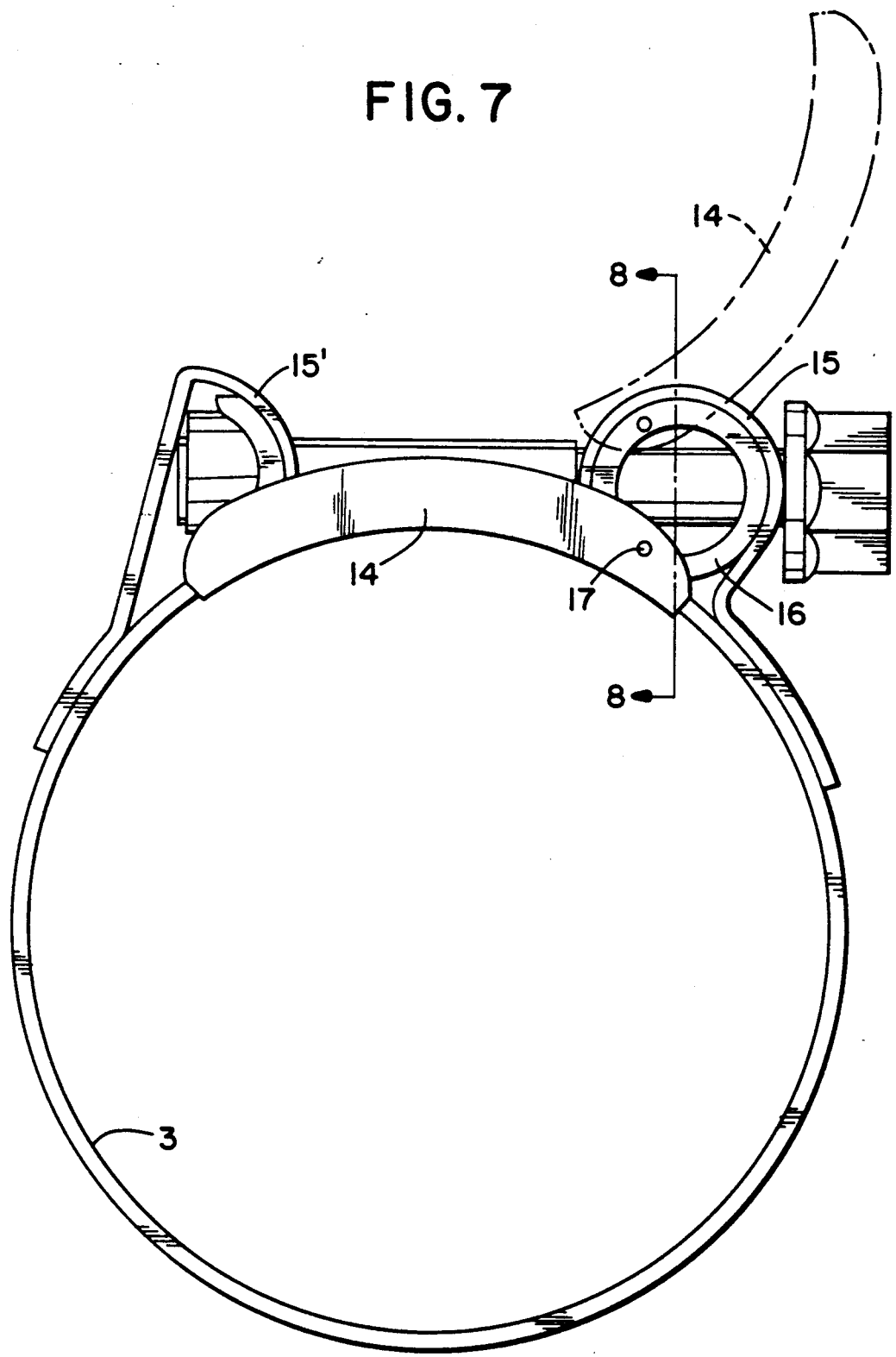
FIG. 7 shows a second embodiment of the invention with a bridging piece in position in solid lines and in a raised position in dotted lines.

Referring now to FIGS. 1-6 of the drawings, a first embodiment of the novel hose clamp of this invention comprises a metal band 3 having ends 1 and 2 formed into closed loops. The metal band 3 prior to forming is shown in FIGS. 5 and 6. A flat metal strip is provided with elongated slots 12, 12' and 13, 13'. Slots 12, 12' are longer than slots 13, 13'. The slotted strip is then formed into a part circular loop to accommodate various hose diameters. The end portions 1 and 2 are bent over to form closed loops each having an inner curved section 4 doubled over to form a substantially straight outer section 5. As shown in FIG. 1, an end portion of the straight section 5 is bent to conform to the shape of band 3 and is suitably bonded thereto at this location. In the loop so completed, longer slots 12, 12' are situated on the curved sections 4 in opposed relationship while the shorter slots 13, 13' are situated on the outer straight sections 5.

A captive nut 6, 7 of unique construction is installed within the space defined by curved section 4 and straight section 5 at end 1. As shown in FIGS. 3 and 4, the captive nut comprises a tubular nut 6 with internal threads extending from a curved flange 7 of part cylindrical shape. The curvature of the flange 7 is selected to match the internal curvature of curved section 4. As shown in FIGS. 1 and 2, the captive nut is placed within the end loop at 1 with the tubular section 6 projecting through slot 12. Curved flange 7 lies against the internal curvature of loop section 4. Tubular nut 6 and flange 7 are held in place by friction which prevents the nut from falling out when the clamp is not in use. It can be seen in FIG. 1 that the tubular nut 6 and flange 7 can move arcuately up and down slot 12. This movement provides for a better clamping action as will be explained below.

The closed loop at end 2 of band 3 is the same as the closed loop at end 1 and comprises curved section 4, straight section 5 and slots 12', 13'.

A tightening screw 9 is provided to draw the clamp together The screw 9 is provided with a driving head 10 and flat circular flange 11. It is threaded for a major portion of its length down to tip 8.

In use, the clamp is placed over a hose connection and the bolt 9 passed through slots 13', 12'. The threaded tip 8 of the bolt is inserted in nut 6 and the bolt driven by head 10 until the flat washer 11 bottoms against the straight section 5 with the force necessary to supply the proper clamp tension. In the process the nut 6 does not rotate because it is restrained by flange 7 which provides the reactive force to pull the closed loop at 1 towards the closed loop at 2. However, the nut 6 can move arcuately up and down slot 12 to follow the side movements of the screw when the ends of the clamp gradually draw together in a curve in consequence of the tightening of the screw head. It should also be noted that the bolt 9 and nut 6 are protected from damage by any interfering parts.

Figure 8:
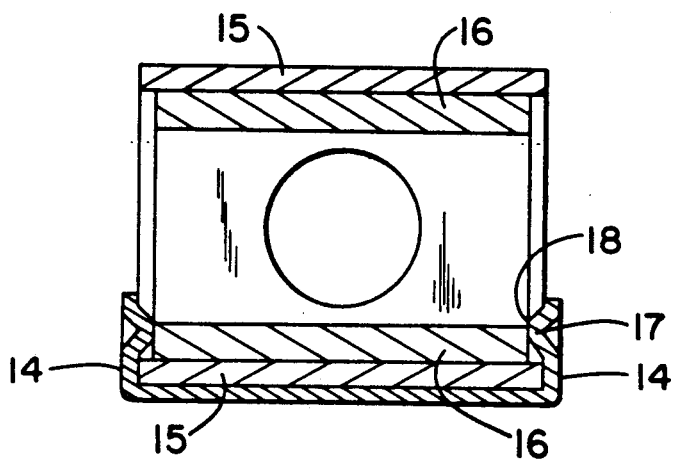
FIG. 8 is a cross sectional view taken along lines 8—8 of FIG. 7 showing the pivotal connection of the bridging piece.

A second embodiment of the invention is shown in FIGS. 7-11. This embodiment employs an extension tab or bridging element 14 to cover the gap between the two end loops. The bridging element is in the form of an arcuate channel which overlies the hose circumference between the clamp loops and extends from underneath one clamp to the other. As shown in FIG. 7, end loop 15 is circular in shape. A tube 16 is inserted in this loop for limited arcuate movement. The tube 16 is provided with two opposed medial holes to receive the tightening bolt. The tube 16 is provided with pins or recesses for pivotally mounting the bridging element. As shown in FIG. 8, tube 16 has end recesses 18 which receive projections 17 struck from the side walls of the bridging element. When the tightening bolt is removed, the tube 16 and pivotally attached bridging element 14 can be rotated out of position as shown in dotted lines in FIG. 7.

Figure 9:
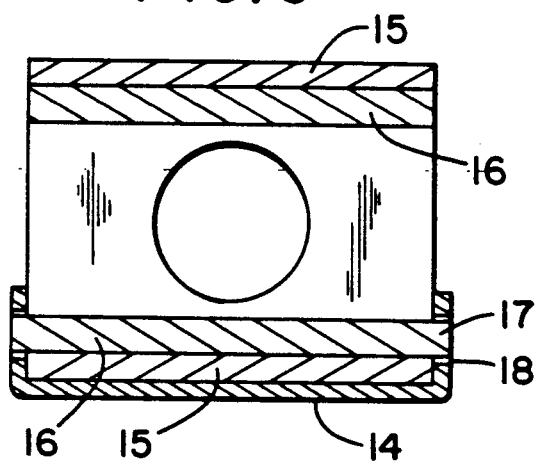
FIG. 9 is a view similar to FIG. 8 showing another pivotal connection for the bridging piece employing a pin connection.
Figure 11:
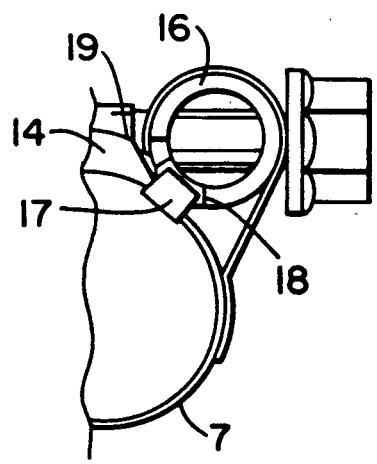
FIG. 11 shows the projecting claws of FIG. 10 in operative position.
Figure 10:
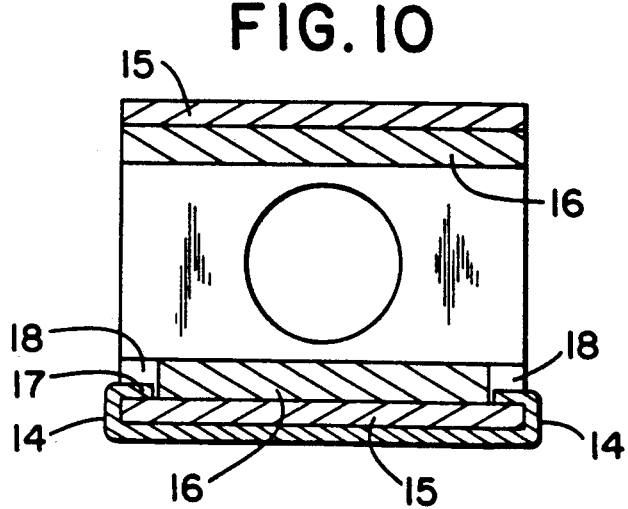
FIG. 10 is a view similar to FIG. 8 showing still another pivotal connection for the bridging piece employing projecting claws.

Bridging element 14 can be pivotally attached to tube 16 by projections 17 extending therefrom into holes 18 provided in the side walls of the bridging element. This feature is shown in FIG. 9. The bridging element 14 can also be attached by means of claws 17 struck from the sidewalls of bridge element 14 and received in holes 18 provided in tube 16. FIG. 11 shows this feature in operative association with tube 16 and the clamping loop.

In use, the bridging element is rotated into position to lie between the clamp loops and to cover the upper circumferential portion of the hose. The tightening bolt is then inserted through the aligned holes in the loop 15 and the tube 16 and threaded into the captive nut in loop 15'. The bolt is tightened until the desired clamping pressure is attained. Because of the pivoted connection between the bridging element 14 and the tube 16 in loop 15, the bridging element adapts to the curve of the advance movement of the loops embracing the wall of the hose without negative pressures thereby providing maximum perpendicular pressure in the space between the loops.

The loops 15' and captive nut can be of the same construction as shown in the first embodiment or of a slightly modified construction.

I claim:

1. A hose clamp comprising a metal strap having first and second closed loops, each said first and second closed loops having a pair of inner and outer aligned slots, said first closed loop having a curved section joined by a substantially straight section in a sharply defined joining angle, an end portion of said straight section being bonded to said strap to form said first closed loop, a captive nut frictionally mounted within said first loop, said captive nut comprising a cylindrical tubular barrel with internal threads and a continuous circumference, an elongated semicylindrical curved flange extending from an end portion of said tubular barrel, the curvature of said flange corresponding to the curvature of said curved section within said first loop, said tubular barrel extending through said inner slot with said attached flange abutting the internal curvature of said first loop, and tensioning means comprising a threaded bolt passing through the aligned openings of said second loop and threaded into said tubular barrel whereby threading said bolt in said tubular barrel causes said tubular barrel to pull said flange and abutting curved section of said first loop toward said second loop to tighten the clamp.

2. The combination of claim 1 wherein said second closed loop is of the same construction as said first closed loop, and has a second straight section, said threaded bolt having a flanged member and attached driving head, said flanged member abutting said second straight section to tighten said clamp.

3. The combination of claim 1 wherein said second closed loop is substantially circular in shape, a cylindrical bushing rotatably mounted in said second closed loop, said bushing having a pair of aligned holes which can be placed in registration with said inner and outer aligned slots, a bridging element extending across the space between said first and second closed loops, said bridging element being pivotally mounted on said bushing whereby when said threaded bolt is passed through said aligned slots in said second loop and said aligned holes in said bushing and threaded into said tubular barrel said loops are drawn together while said bridging element shifts to arrive at the optimum position to apply perpendicular pressure to the space between said loops.

4. A hose clamp comprising a metal strap having first and second closed loops, each said first and second closed loops having a pair of inner and outer aligned slots, said first closed loop being of irregular shape, said second closed loop being substantially circular in shape, a cylindrical bushing rotatably mounted in said second closed loop, said bushing having a pair of aligned holes which can be placed in registration with said inner and outer aligned slots, a bridging element extending across the space between said first and second closed loops, said bridging element comprising an arcuately shaped channel member, said bridging element being pivotally mounted on said bushing and being rotatable with the bushing from an upward open position to a closed position bridging said space between said closed loops, and tensioning means comprising a captive nut mounted in said first loop and a threaded bolt passing through said aligned slots and holes in said second loop and said bushing, respectively, and threaded into said captive nut whereby said loops are drawn together while said bridging element shifts to arrive at the optimum position to apply perpendicular pressure to the space between said loops.

5. The combination of claim 4 wherein said bridging member is pivotally mounted on said bushing by means of pivot pins extending from end portions of said bushing and entering holes provided in said bridging channel member.

6. The combination of claim 4 wherein said bridging member is pivotally mounted on said bushing by means of pivot indentations struck from the side walls of said bridging channel member and entering holes in end portions of said bushing.

* * * * *